J. M. YOUNG & C. M. SYMONDS.
CAN FUSING AND SOLDERING MACHINE FOR SQUARE, RECTANGULAR, OR POLYGONAL CANS.
APPLICATION FILED AUG. 1, 1906.

905,268.

Patented Dec. 1, 1908.
3 SHEETS—SHEET 1.

Witnesses
Wm. Geiger
H. W. Munday

Inventors
John M. Young
Clarence M. Symonds
By Munday, Evarts, Adcock & Clarke
Attorneys J. M. YOUNG & C. M. SYMONDS.
CAN FUSING AND SOLDERING MACHINE FOR SQUARE, RECTANGULAR, OR POLYGONAL CANS.
APPLICATION FILED AUG. 1, 1906.
905,268.
Patented Dec. 1, 1908.
3 SHEETS—SHEET 2.
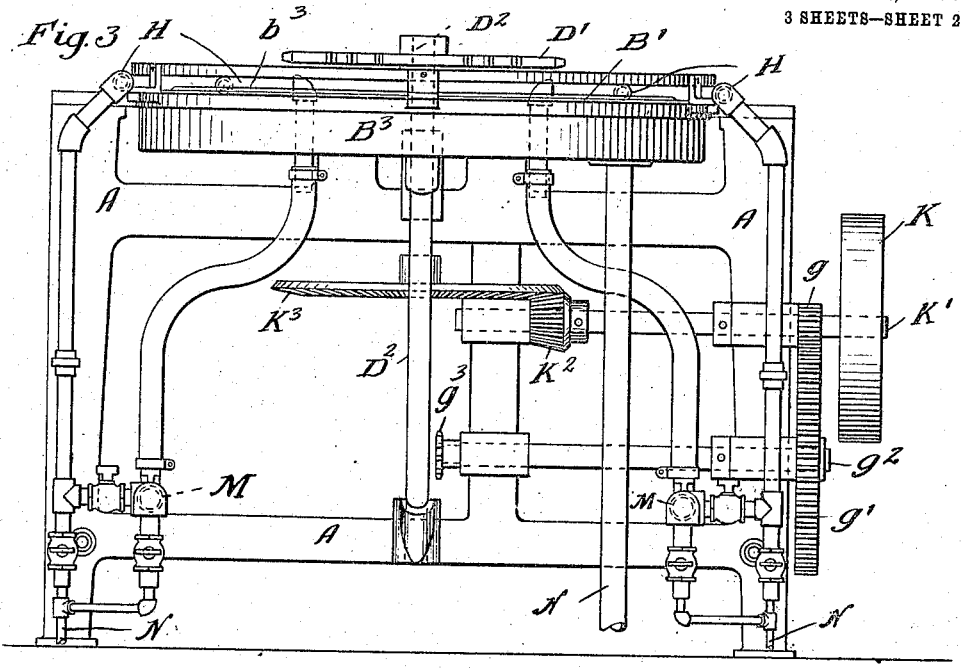
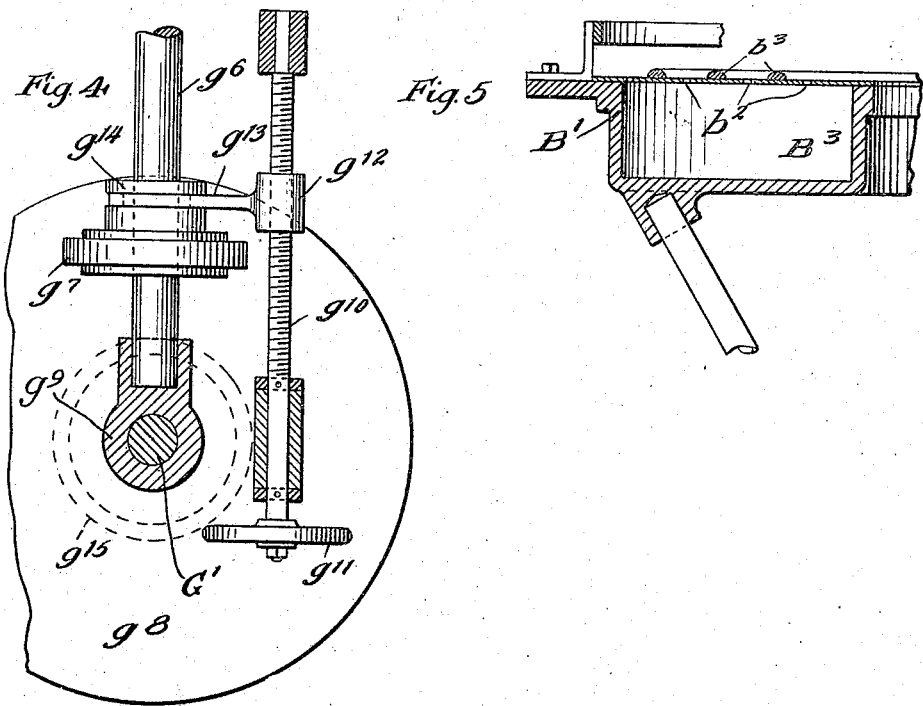
Witnesses:
Wm. Geiger
Inventors:
John M. Young,
Clarence M. Symonds,
By Munday, Evarts, Adcock & Clark.
Attorneys J. M. YOUNG & C. M. SYMONDS.
CAN FUSING AND SOLDERING MACHINE FOR SQUARE, RECTANGULAR, OR POLYGONAL CANS.
APPLICATION FILED AUG. 1, 1906.
905,268.
Patented Dec. 1, 1908.
3 SHEETS—SHEET 3.
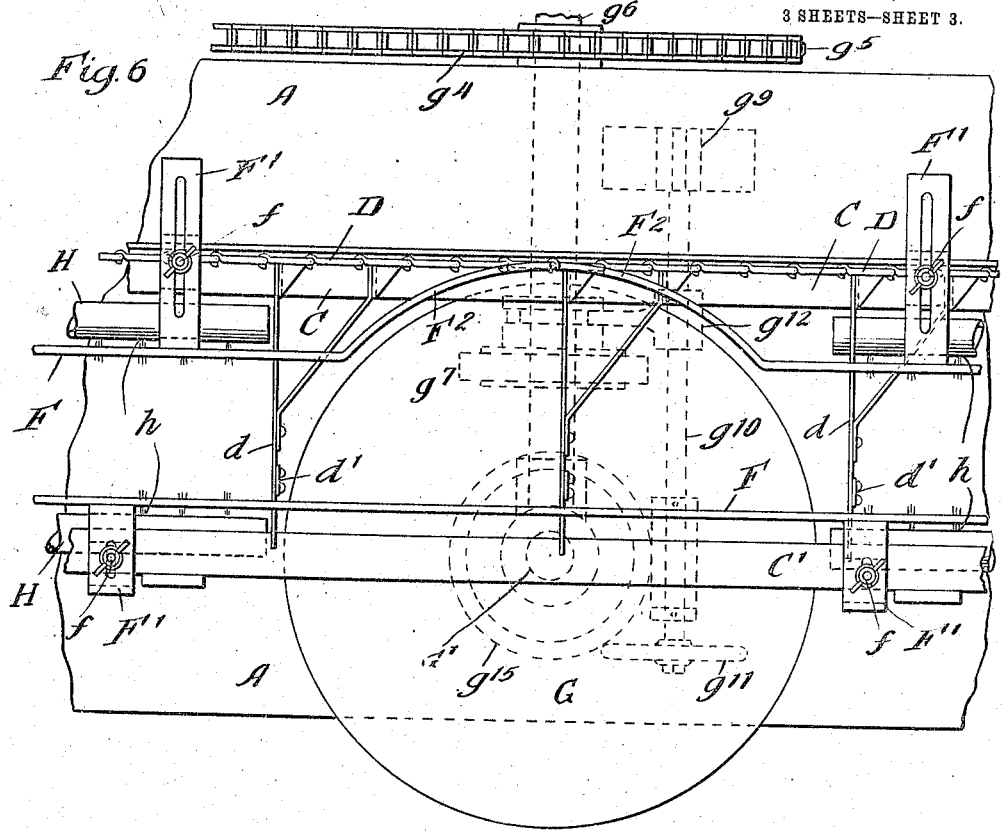
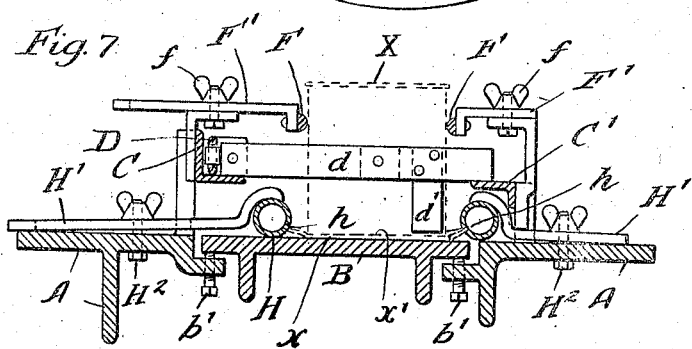

UNITED STATES PATENT OFFICE.

JOHN M. YOUNG AND CLARENCE M. SYMONDS, OF SAN FRANCISCO, CALIFORNIA, ASSIGNORS TO AMERICAN CAN COMPANY, OF NEW YORK, N. Y., A CORPORATION OF NEW JERSEY.

CAN FUSING AND SOLDERING MACHINE FOR SQUARE, RECTANGULAR, OR POLYGONAL CANS.

No. 905,268.      Specification of Letters Patent.      Patented Dec. 1, 1908.

Application filed August 1, 1906. Serial No. 328,752.    REISSUED

*To all whom it may concern:*

Be it known that we, JOHN M. YOUNG and CLARENCE M. SYMONDS, citizens of the United States, residing in San Francisco, in the county of San Francisco and State of California, have invented a new and useful Improvement in Can Fusing and Soldering Machines for Square, Rectangular, or Polygonal Cans, of which the following is a specification.

Our invention relates to improvements in machines for soldering the heads upon square, rectangular or polygonal cans by fusing solder previously applied to the can bodies near the ends thereof.

The object of our invention is to provide a square, rectangular or polygonal can fusing machine of a simple, efficient and durable construction by means of which square, rectangular or polygonal cans may be rapidly, cheaply and perfectly soldered by fusing solder ribs or beads previously applied to the can bodies near the ends thereof.

Our invention consists in the novel construction of parts and devices, and in the novel combinations of parts and devices, herein shown and described, by which this object or result is accomplished.

Figure 1:
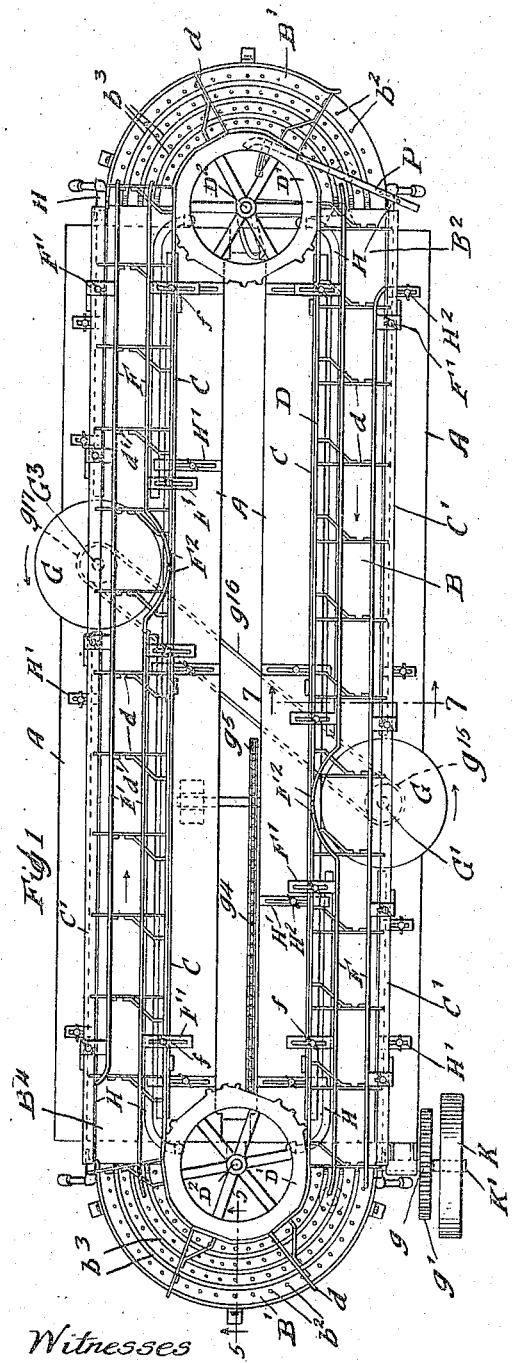
Figure 2:
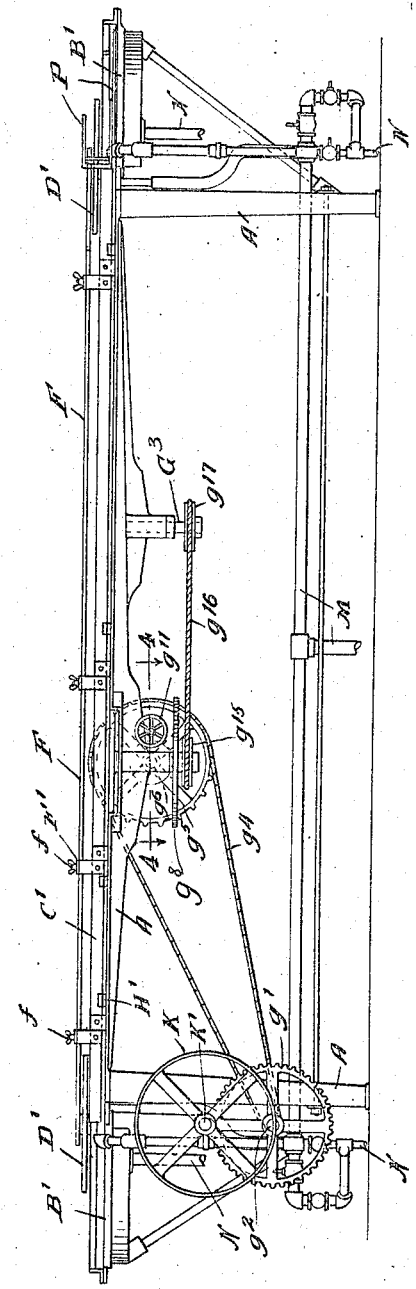

In the accompanying drawing forming a part of this specification, Figure 1 is a plan view of a square, rectangular or polygonal can fusing machine embodying our invention. Fig. 2 is a side elevation. Fig. 3 is an end view. Fig. 4 is a detail horizontal section on line 4—4 of Fig. 2. Fig. 5 is a detail vertical section on line 5—5 of Fig. 1. Fig. 6 is an enlarged detail plan view of the can turning mechanism and Fig. 7 is an enlarged detail section on line 7—7 of Fig. 1.

In the drawing, A represents the frame of the machine.

B is a can supporting track or plate along which the cans X are conveyed or moved in an upright position with the head $x$ to be soldered lowermost, and resting flat against the can track or plate B, the same being preferably of a loop form and having circular or curved end portions $B^1$ at each end.

D is an endless flexible can conveyer or chain furnished with a series of can pusher arms $d$ for pushing the cans along the track B, the same being operated by horizontal pulleys or sprocket wheels $D^1$ $D^1$ having vertical shafts $D^2$ $D^2$ journaled upon the frame of the machine.

C is a track for supporting the can carrier or chain D, the same consisting preferably of an angle iron secured to the frame of the machine, and $C^1$ is a track or guide for supporting the free ends of the can pusher arms $d$.

F F are adjustable guides for the cans between which the cans move as they are conveyed over the track or plate B by the can conveyer or chain D. These can guides F F are supported on brackets $F^1$ attached to the frame of the machine and adjusted to and from each other, according to the size of the cans being operated upon, by the adjusting screws $f$. The can pusher arms $d$ are each furnished with an upright arm $d^1$ to engage the can and prevent any tendency for it to tip as it is pushed along the track and thus insure the lower head of the can resting flat against the can track or plate B. This is of special importance in operating upon rectangular cans like oyster cans, for example, which are of considerable height and narrow in thickness. The can guides F preferably have half round faces to engage the cans.

At each side of the machine, the can track or plate B is provided with a circular recess to receive a rotating can turning plate G which operates in conjunction with the conveyer D and its pusher arms $d$ to give the cans a quarter turn after the two opposite seams thereof have been fused so as to bring the remaining seams thereof in position for fusing. These rotating can turning plates G are driven at a different surface speed from the conveyer D, and preferably have a higher surface speed than the conveyer, to facilitate the turning of the cans. At the point where the rotating can turning plates G are located, the inner can guides F are provided with circularly curved portions $F^2$ to coöperate with the rotating can turning plates G.

H H are heater pipes having jet orifices $h$ for projecting flame against the solder rib or bead $x^1$ on the can body near the lower end thereof and against the seam to effect the fusing operation. These heater pipes are arranged parallel and adjacent to the path of the cans as they are above and parallel to the can track B. The jet orifices $h$ preferably project downwardly or have a downward incline so as to project the flame properly against the solder to be fused and the joint or seam to be soldered. The can track B is supported on adjusting screws $b^1$ so that it may be adjusted up and down as required. The heater pipes H are adjustably secured in position by means of clamps $H^1$ and clamp bolts $H^2$.

The ends or curved portions $B^1$ of the can track B are provided with perforations $b^2$; and below this curved portion is arranged an air reservoir $B^3$ so that cold air may be projected up against the cans after the fusing operation to cool the seams while the can seams remain in a horizontal position. To facilitate the cooling operation, this curved portion $B^1$ of the can track B is provided with ribs or rails $b^3$ to better admit the air blast against the heated and freshly soldered seam of the can.

The can conveyer or chain D is driven continuously from the driving pulley K on the driving shaft $K^1$ by the bevel gear $K^2$ thereon meshing with the bevel gear $K^3$ on upright shaft $D^2$ of one of the sprocket wheels $D^1$. Motion is communicated from the driving shaft $K^1$ to one of the rotary can turning disks or plates G through a gear $g$ on the driving shaft K meshing with a gear $g^1$ on the countershaft $g^2$ having a sprocket wheel $g^3$ and chain $g^4$ engaging a sprocket wheel $g^5$ on a horizontal shaft $g^6$ which is furnished with a sliding or adjustable friction roller $g^7$ engaging a friction disk $g^8$ on the upright shaft $G^1$ of the rotary can turning disk or plate G. By adjusting the friction roller $g^7$ in or out, the can turning disk or plate G can be given any required speed of rotation in respect to the speed of the can conveyer or chain D which may be necessary to properly give the cans a quarter turn after the two opposite seams thereof have been fused or soldered and thus present the two remaining sides or seams thereof to the action of the fusing or heating pipes which are arranged parallel to and on each side of the path of the cans. The shaft $g^6$ is journaled at its inner end on a bearing $g^9$ through which the upright shaft $G^1$ extends. The friction roller $g^7$ is adjusted radially in or out in respect to the friction disk $g^8$ by means of an adjusting screw $g^{10}$ having a hand wheel $g^{11}$ and furnished with a nut or threaded sleeve $g^{12}$ having an arm $g^{13}$ engaging a curved collar or hub $g^{14}$ on the friction roller $g^7$. If the cans to be soldered are square or have all their four sides equal, all the can guides F are adjusted the same distance apart, but in soldering cans like oyster cans where two of the sides are much shorter than the other two, the can guides F for soldering each pair of sides of the can are preferably correspondingly adjusted, those on one side of the can turning disk or plate G being farther apart and those on the other side closer together.

M is a gas pipe for supplying fuel to the burner pipe H and N compressed air pipes for supplying compressed air to the burner pipe and to the cooler reservoirs $B^3$.

The shaft $G^1$ of the can turning disk G, which is geared to the driving shaft, is furnished with a pulley $g^{15}$, and through a belt or rope $g^{16}$ and pulley $g^{17}$ communicates motion to the upright shaft $G^3$ of the other can turning disk G on the opposite side of the machine.

In operation, the cans are placed on the can track or plate B at $B^2$ in position to be engaged by the arms $d$ of the can conveyer chain D and are moved slowly along between the heater or flame projecting pipes H, thus fusing the solder $x^1$ on the can body X above the can head flange and causing the same to flow down into the seam and thus form a perfect solder joint. After two opposite sides of the rectangular can have thus been fused or soldered, the cans are moved by the pusher arms $d$ of the conveyer D onto the can turning disk G, and by its action, in coöperation with the conveyer D and pusher arm $d$, given a quarter turn, thus bringing the two remaining sides of the cans adjacent to the heating pipes H so that the two remaining seams are fused and soldered. The cans then pass onto the curved portion $B^1$ of the can track or plate B and the hot and freshly soldered end seam of the can is thus cooled and the solder set. The operator then turns the can end for end at $B^4$ and the operation is repeated for the other end of the can by the remaining half of the machine, after which the cans are automatically discharged from the machine by the inclined can discharging arm P.

We claim:—

1. In a rectangular or polygonal can fusing machine or soldering machine for soldering the end seams of cans by fusing solder previously applied to the can body, the combination with an endless can track or plate of loop form and having curved end portions, of an endless flexible can conveyer furnished with a series of can pusher arms for pushing the cans along said track, horizontal pulleys for operating said conveyer, a track for supporting said conveyer, adjustable guides for the cans between which the cans move as they are conveyed over the track by the can conveyer, heater pipes above and parallel to said can track provided with jet orifices for projecting flame against the cans, rotating can turning disks arranged in said can track to give the cans a quarter turn and means for adjusting the speed of said can turning disks in relation to the speed of the can conveyer, substantially as specified.

2. In a rectangular or polygonal can fusing machine or machine for soldering the end seams of cans by fusing solder previously applied to the can body, the combination with an endless can track or plate of loop form and having curved end portions, of an endless flexible can conveyer furnished with a series of can pusher arms for pushing the cans along said track, horizontal pulleys for operating said conveyer, a track for supporting said conveyer, adjustable guides for the cans between which the cans move as they are conveyed over the track by the can conveyer, heater pipes above and parallel to said can track provided with jet orifices for projecting flame against the cans, rotating can turning disks arranged in said can track to give the cans a quarter turn and means for adjusting the speed of said can turning disks in relation to the speed of the can conveyer, the curved portion of said can track at each end thereof having openings through the same and air blast containers beneath said perforated track, substantially as specified.

3. In a can fusing machine, the combination with a track for supporting the cans, a conveyer for moving the cans along the track as they rest thereon, and gas burner pipes above and on each side of the track and between which the cans are conveyed, 4. In a can fusing machine, the combination with a track for the cans, a conveyer for moving the cans along the track, and burner pipes on each side of the track and between which the cans are conveyed, said track being provided with a rotating can turning disk for giving the cans a quarter turn, substantially as specified.

5. In a can fusing machine, the combination with a track for the cans, a conveyer for moving the cans along the track, heater pipes on each side of the track and between which the cans are conveyed, said track being provided with a rotating can turning disk for giving the cans a quarter turn, and means for adjusting the speed of said can turning disk, substantially as specified.

6. In a can fusing machine, the combination with a track for the cans, a conveyer for moving the cans along the track, heater pipes above and on each side of the track and between which the cans are conveyed, said track having a perforated portion and an air blast reservoir beneath the same for cooling the cans, substantially as specified.

7. In a can fusing machine, the combination with an endless loop can track having curved portions at the ends thereof, a conveyer for moving the cans along said track, heater pipes on each side of said track for fusing the solder on the cans as they are conveyed along, and rotating can turning disks arranged in the path of the cans for giving them a partial turn, substantially as specified.

8. In a can fusing machine, the combination with an endless loop can track having curved portions at the ends thereof, a conveyer for moving the cans along said track, heater pipes on each side of said track for fusing the solder on the cans as they are conveyed along, rotating can turning disks arranged in the path of the cans for giving them a partial turn, and guides for the cans above said can track, substantially as specified.

9. In a can fusing machine, the combination with an endless loop can track having curved portions at the ends thereof, a conveyer for moving the cans along said track, heater pipes above and on each side of said track for fusing the solder on the cans as they are conveyed along, rotating can turning disks arranged in the path of the cans for giving them a partial turn, and guides for the cans above said can track, the inner guides adjacent to said can turning disks having curved portions to coöperate with said turning disks, substantially as specified.

10. In a can fusing machine, the combination with an endless loop can track having curved portions at the ends thereof, a conveyer for moving the cans along said track, heater pipes on each side of said track for fusing the solder on the cans as they are conveyed along, rotating can turning disks arranged in the path of the cans for giving them a partial turn, and guides for the cans above said can track, the inner guides adjacent to said can turning disks having curved portions to coöperate with said turning disks, and a can discharging arm, substantially as specified.

11. In a can fusing machine, the combination with an endless loop can track having curved portions at the ends thereof, a conveyer for moving the cans along said track, heater pipes on each side of said track for fusing the solder on the cans as they are conveyed along, rotating can turning disks arranged in the path of the cans for giving them a partial turn, and guides for the cans above said can track, the inner guides adjacent to said can turning disks having curved portions to coöperate with said turning disks, and means for adjusting the speed of said can turning disks, substantially as specified.

JOHN M. YOUNG.
CLARENCE M. SYMONDS.

Witnesses:
C. H. Temple,
M. H. Gillespie,
Chas. F. Cooke,
N. J. Begger.